US011865661B2

(12) United States Patent
Martin et al.

(10) Patent No.: US 11,865,661 B2
(45) Date of Patent: Jan. 9, 2024

(54) DEVICE FOR LOADING AND UNLOADING AND FOR OPERATING A MACHINE VISE

(71) Applicant: WST Präzisionstechnik GmbH, Löffingen (DE)

(72) Inventors: Rudolf Martin, Löffingen (DE); Markus Pfeifer, Löffingen (DE)

(73) Assignee: WST PRÄZISIONSTECHNIK GMBH, Loeffingen (DE)

( * ) Notice: Subject to any disclaimer, the term of this patent is extended or adjusted under 35 U.S.C. 154(b) by 127 days.

(21) Appl. No.: 17/498,096

(22) Filed: Oct. 11, 2021

(65) Prior Publication Data

US 2022/0118571 A1    Apr. 21, 2022

(30) Foreign Application Priority Data

Oct. 15, 2020   (DE) .................... 10 2020 127 201.4

(51) Int. Cl.
  *B23Q 7/04*      (2006.01)
  *B23Q 1/44*      (2006.01)
(52) U.S. Cl.
  CPC .............. *B23Q 7/046* (2013.01); *B23Q 1/44* (2013.01)
(58) Field of Classification Search
  CPC .................................. B23Q 7/046; B23Q 1/44
  See application file for complete search history.

(56) References Cited

U.S. PATENT DOCUMENTS

| 5,473,545 A * | 12/1995 | Schausten ............ B65G 1/1371 700/215 |
| 2019/0262957 A1* | 8/2019 | Sugiura .................. B23Q 7/046 |
| 2021/0046599 A1* | 2/2021 | Morimura .............. B23Q 17/12 |

FOREIGN PATENT DOCUMENTS

| DE | 9312897 U1 | 2/1994 |
| DE | 202019102742 U1 | 6/2019 |
| DE | 102018008428 A1 | 4/2020 |
| EP | 3715047 A2 | 9/2020 |
| KR | 102123695 B1 | 6/2020 |
| WO | 2019/175024 A1 | 9/2019 |
| WO | 2019175042 A1 | 9/2019 |

* cited by examiner

*Primary Examiner* — Gerald McClain
(74) *Attorney, Agent, or Firm* — Bachman & LaPointe, P.C.

(57) ABSTRACT

A device for loading and unloading and for operating a machine vise (10) of a machine tool (02), the device having a positioning device (13) mounted so as to be displaceable along a longitudinal direction (L), a coupling unit (14) movable together with the positioning device (13) being disposed at one end of the positioning device (13) in the longitudinal direction (L) for the detachable mechanical coupling to a machine vise (10) of the machine tool (02) and for the operation, in particular opening and closing, of the machine vise (10) and a workpiece handling unit (15), in particular a multiaxial robot unit, being disposed on the positioning device (13) behind the coupling unit (14) in the longitudinal direction (L) so as to be movable together with the positioning device (13).

14 Claims, 3 Drawing Sheets

DEVICE FOR LOADING AND UNLOADING AND FOR OPERATING A MACHINE VISE

BACKGROUND OF THE INVENTION

The present invention relates to a device for loading and unloading and for operating a machine vise. Furthermore, the present invention relates to a system comprising a device mentioned above and a machine tool having a machine vise. Moreover, the invention relates to a method for operating a machine vise of a machine tool, in particular by means of a device mentioned above or a system mentioned above.

In the manufacturing of components, in particular in the manufacturing of metal components, from workpiece blanks, extensive automation has already been achieved in the past for the actual processing of the workpiece blank or of the semi-finished product. Among other things, machine tools, for example milling machines and/or lathes, are known which produce complex components from workpiece blanks in the form of a cuboid or cube, for example, in a mostly fully automatic manner; this is made possible especially by machine tools having exchangeable tools in conjunction with the CAD-CAM technology on the basis of digital data or digital models of the components.

Additionally, in large-scale production, production lines are already known in which the blank or the semi-finished product is automatically transported between different processing stations or between different tool units.

In this context, the teaching of WO 2019/175024 A1 is known, for example, in which a workpiece handling unit, for example a multiaxial robot unit, can have a vise which receives a workpiece or a blank and which then transports said workpiece or blank to a processing tool or to different processing tools.

Even though this leads to automation, the disadvantage is that the processing of blanks which have different dimensions or which are made of different materials is not or at least not easily possible without appropriate modification of the device or plant.

Another disadvantage of the known approaches to the automatic handling of workpieces, in particular blanks, of the above type is that said approaches cannot be integrated into existing production plants, for example into existing machine tools, preferably milling machines or lathes, or that said integration requires considerable effort in terms of construction and financing.

This results in the problem that manufacturing facilities or manufacturing companies have had the choice of either operating the existing machine tools without automated loading and unloading. In this case, a relatively large number of personnel is required to insert the respective workpieces or blanks into the machine tool, to clamp them correctly and properly in a machine vise and to remove them after having been processed correspondingly by the machine tool.

Alternatively, it has been possible to automate the supply and removal or the loading and unloading and the clamping of the workpieces, which, however, required a high level of financial investment and was economically viable only for the production of components above a certain quantity as a result of the relatively low flexibility.

SUMMARY OF THE INVENTION

Starting from this state of the art, the object of the present invention is to propose a device, a system and a method which allows easy, flexible and automatic loading and unloading and operation of a machine vise of a machine tool, in particular without the need for significant structural changes or adjustments to said machine tool.

Said object is attained by a device having the features disclosed herein. Additionally, the object is attained by a system having the features disclosed herein. Furthermore, the object is attained by a method which is described below and which is also to be independently claimable.

Advantageous embodiments are disclosed in the dependent claims and in the description.

The device according to the invention for loading and unloading and for operating a machine vise of a machine tool comprises a positioning device which is mounted so as to be displaceable along a longitudinal direction or longitudinal axis. Furthermore, the device comprises a coupling unit which is movable together with the positioning device and which is disposed at one end of the positioning device in the longitudinal direction and which serves for the detachable mechanical coupling to a machine vise of the machine tool and for the operation, in particular opening and closing, of the machine vise. Additionally, the device has a workpiece handling unit, in particular a multiaxial robot unit, which is disposed behind the coupling unit in the longitudinal direction and which is also movable together with the positioning device.

Thus, the idea of the invention is to propose a device which can be detachably coupled to a machine vise of a machine tool and which can operate, in particular open, close and clamp, the machine vise in the coupled state, wherein a workpiece handling unit is conveyed or transferred to the machine tool and its vise in the coupled state of the coupling unit in such a manner that a loading and unloading, i.e., a supply of blanks and a removal of processed workpieces or components, can be automated by the workpiece handling unit.

Since the device not only supplies the blanks or equips or loads the machine tool, but also operates or controls the machine vise, workpieces or blanks which have different cuboid or cubical geometries and which are made of different materials can be machined or processed in a flexible manner and without modification of the device or of the machine tool. Only the maximal opening width of the clamping jaws of the machine vise and the other dimensions of the machine vise or other limitations on the part of the machine tool restrict the dimensions of the blanks or workpieces to be processed.

An advantage of the device according to the invention is that no clamping device or vise unit has to be moved together with the workpiece by the workpiece handling unit, as only the secure gripping and holding of the workpiece has to be enabled. Weights/masses to be moved and to be accelerated can thus be saved on the part of the workpiece handling unit, for example of the multiaxial robot. This in turn has the effect that a wide range of workpieces, in particular larger and heavier workpieces, can be handled and moved by the workpiece handling unit. Additionally, this has the effect that relatively small and compact workpiece handling units, for example multiaxial robot units, can be used for relatively large and heavy workpieces as a result of the saving of masses to be moved and to be accelerated. Advantageously, this allows the use in conjunction with compact machine tools which could not be accessed by means of more massive or more voluminous workpiece control units, at least not without substantial structural changes to the machine tool.

Thus, the device according to the invention allows the subsequent automation of the loading, unloading and clamping of workpieces for existing machine tools in a reversible manner and therefore for a limited period of time, if intended. This is because the machine tool itself can continue to be operated largely or completely unchanged. Depending on the coupling state of the coupling unit and depending on the state of the positioning device, the machine tool can also continue to be loaded and unloaded manually and workpieces can be clamped. In a multi-shift manufacturing process or in a multi-shift production process, for example, the use of the device according to the invention can thus have the effect that the machine tool is operated manually, in particular loaded and unloaded manually, and workpieces are clamped into the machine vise for a certain period of time; in the course of a night shift, for example, the same machine tool can be loaded and unloaded automatically and the machine vise can be operated automatically for a certain period of time following a displacement of the positioning device, which now leads to a coupling of the coupling unit to the machine tool.

For example, the positioning device can be realized as a positioning table which is displaceable in the longitudinal direction, both the coupling unit and the workpiece handling unit being disposed on and fixed to said positioning table.

For example, the workpiece handling unit can be designed as a multiaxial robot unit, for example as a six-axis robot. The displacement of the positioning device, of the coupling unit and of the workpiece handling unit can preferably be achieved electronically and/or pneumatically, preferably using compressed air. The combination of a movement of the positioning device along its longitudinal axis and a robot as a workpiece handling unit which has six axes preferably results in a device which has seven or 6+1 movement axes. In anticipation of the following disclosure, eight or 6+2 axes can also be assumed if a rotation axis for the rotatory drive of the coupling unit, for example a coupling piece, is included. With the exception of the longitudinal axis itself, all other axes used for the operation and loading of the machine vise are displaceable parallel to the longitudinal axis of the positioning device by the movement of the positioning device along the longitudinal axis, because both the workpiece handling unit and the coupling unit are moved or movable together with the positioning device.

In the present description, the arrangement of the workpiece handling unit behind the positioning device is to be understood in such a manner that at least part of the coupling unit first comes into contact with the machine tool when the positioning device is moved or displaced towards the machine tool. An exemplary arrangement can thus provide that the workpiece handling unit is disposed above the coupling unit and approximately at the same height or at least partially overlaps in the longitudinal direction, provided that the coupling unit can establish a coupling to the machine vise without being hindered by the workpiece handling unit.

An advantageous embodiment can provide that the coupling unit has a, preferably spring-loaded, balancing system which is movable in relation to the positioning device in the longitudinal direction and a coupling piece which is driven in a rotatory manner by means of a drive motor and which is movable together with the positioning device and serves for the coupling to a drive journal or a drive spindle of the machine vise.

Advantageously, this has the effect that the balancing system first comes into contact with the machine vise when the positioning device is displaced and that the balancing system is first dips or elastically displaced by a certain spring travel in relation to the positioning device and therefore against the movement direction of the positioning device when the positioning device is displaced or moved further; this takes place until or before the coupling piece in the form of an internal hexagon socket, for example, engages with a corresponding drive spindle or drive journal of the machine vise in the form of a conventional external hexagon socket, for example, which then establishes the mechanical coupling between the device and the machine vise. The balancing system can then not only be used as a mechanical protection and for guiding the coupling piece, but the state of the balancing system, for example the spring travel or the dipping distance of the spring-loaded balancing system, can also provide important information on the coupling state and therefore make it possible to monitor a safe coupling or a safe and successful provision of the coupling and facilitate it as a whole. For example, it can be specified that a complete and safe coupling can only be assumed when the balancing system has covered a specific dipping distance. To reach said dipping distance, different coupling measures may be provided. For example, a slow and slight rotation or displacement of the coupling piece can be caused if the dipping distance of the balancing system indicates that the drive spindle or the drive journal of the machine vise already contacts a distal end of the coupling piece, although the coupling piece does not yet engage around or enclose the drive journal or the drive spindle.

Moreover, the spring-loaded balancing system can provide protection for the coupling piece in the decoupled or uncoupled state, because the balancing system can advantageously be designed and dimensioned in such a manner that the coupling piece protrudes from a recess of the balancing system only after the balancing system has covered a certain dipping distance or a corresponding travel distance in relation to the positioning device.

Another advantageous embodiment can provide that the workpiece handling unit is realized and disposed in such a manner that a workpiece holder of the workpiece handling unit can reach a machine vise when the coupling of the coupling unit to the machine vise has taken place. The fact that the machine vise can be reached allows inserting and removing the workpiece held by the workpiece holder into/from the machine vise. In this context, the advantageous effect of a workpiece handling unit which can be moved together with the positioning device is shown. For owing to the fact that the workpiece handling unit is moved together with the coupling unit towards the machine tool in the course of establishing the coupling to the machine tool, the workpiece handling unit can be relatively small or compact and still or at the same time be able to bridge the necessary distances in order to insert and remove the workpieces into and from the machine vise.

Another advantageous embodiment can provide that the device has a shared control system for the workpiece handling unit and the coupling unit and preferably for the positioning device.

This has the advantageous effect that the device can insert or load the workpiece or the blank into the machine tool, in particular into the machine vise, pre-tension and/or clamp the workpiece or blank there and remove it in a coordinated manner. The control data or control commands used or executed by the control system in order to receive a workpiece or blank which is made of a specific material and which has specific dimensions and to be able to transport it to the machine vise, can at the same time also be used to operate the machine vise accordingly, in particular to open and/or to close the machine vise, via the coupling unit, in particular via the coupling piece which is driven in a rotatory manner.

Another particularly preferred embodiment of the device can provide that the control system can detect the coupling state and/or the state of the machine vise by means of at least one sensor of the coupling unit, in particular of the drive motor of the coupling piece and/or of the balancing system. In principle, different components and measurement methods can be used as sensors. A first, particularly advantageous embodiment can provide that the current consumption and/or voltage consumption of the drive motor of the coupling piece is monitored or detected and that a conclusion on the state of the machine vise, for example a conclusion on the clamping force of the clamping jaws which is applied to the workpiece, can be drawn on the basis of said operating data or operating states. In principle, various options are available for one or several sensors of the balancing system. Here, as already indicated or explained above, one of the interesting aspects is whether and to what extent the balancing system is moved or displaced in relation to the positioning device compared to an initial position or rest position. The state of the coupling and the state of the machine vise, in particular a clamping state of a workpiece, can be indirectly detected or a conclusion regarding said states can be drawn on the basis of said aspect, but also on the basis of other properties and states of the balancing system and of the coupling piece.

Another preferred embodiment of the device can provide that the control system is configured to transfer a workpiece to a coupled machine vise and to remove the workpiece by means of the workpiece handling unit and that the control system is also configured to open and to close the machine vise and to establish an intended clamping of the workpiece depending on the workpiece when closing the machine vise and to maintain the clamping, if applicable. In addition to the intended clamping depending on the workpiece, the control system can also be configured to create or to cause a pre-tensioning of the machine vise depending on the workpiece. In this manner, the automation of the machine tool with respect to loading and unloading, including operating or actuating the machine vise, is ensured.

Another advantageous embodiment can provide that the device has a shared housing which encloses the positioning device together with the coupling unit and the workpiece handling unit in a retracted state of the positioning device. Advantageously, a particularly compact design of the device can thus be realized, in particular in a state in which no coupling to a machine tool, in particular to a machine vise, is established or provided. This in turn allows good and easy access to the machine tool in an uncoupled state of the device. Additionally, the device is provided as a module or module unit by the shared housing; in addition to the advantages mentioned above, said module or module unit generally allows a variable use of the device, for example on different machine tools.

Another advantageous embodiment of the device can provide that the housing comprises a workpiece storage or a coupling device for an, in particular external, workpiece storage or a workpiece supply device. In an internal workpiece storage disposed in the housing, the automated operation of the machine vise and the supply and removal, i.e., the loading and unloading, of the machine vise can be further advanced. However, in order to not unduly expand the compact dimensions of the device, in particular of the housing, only a limited workpiece storage can be realized inside the housing. If the device is to perform an automated loading and unloading of the machine tool, in particular of the machine vise, and a clamping of the workpieces for long periods of time, for example for several hours, several days or even longer, the coupling of an external workpiece storage to the housing or the coupling of a workpiece supply device to the housing can thus be advantageous. To this end, the housing has corresponding coupling devices in an advantageous embodiment.

Another preferred embodiment of the device can provide that the housing has a roller system comprising a zero fixation system at the bottom. This has the advantageous effect that the device can be used in a variable and mobile manner in conjunction with different machine tools, i.e., it can be coupled to different machine tools in order to operate and load and unload the machine vise. To perform the set up, adjustment and start up of the device on the respective machine tool as fast and as uncomplicatedly as possible, a zero fixation system is advantageously provided in addition to a roller system of the housing of the device; in interaction with appropriate means, for example rails, elbows or the like which can be disposed at the bottom in front of the machine tool, the zero fixation system allows a fast and well-defined arrangement and fixation of the device in the environment, in particular in front of a machine tool.

Another particularly advantageous embodiment of the device can also provide that the housing accommodates all operating and control devices required for the operation of the device, meaning that only an electric supply and/or a compressed air supply and/or a communication interface thus has to be provided for the operation of the device. In other words, this means that, for example, all components required for the operation of the workpiece handling unit, for the operation of the positioning device and for the operation and drive of the coupling unit are disposed in the housing or integrated into the housing and only the required drive energy must be supplied from outside to the device or to the housing in the form of electrical energy or in the form of compressed air. Furthermore, for a use or operation of the device which is as independent and therefore as mobile as possible, the appropriate transmission of data relating to the handling of workpieces to the device via a communication interface is useful and therefore advantageous. Wired and wireless technologies are available as communication interfaces.

Another particularly advantageous embodiment of the device can provide that the housing has a base area between 0.8 m$^2$ and 1.5 m$^2$, preferably between 1.0 m$^2$ and 1.2 m$^2$. Advantageously, this has the effect that the device according to the invention can be used in a manufacturing or production environment which is provided or equipped with known and generic machine tools, even if extremely little free space is available in the environment, in particular in front of the machine tool. Furthermore, the low space consumption of the device according to the invention has the effect that this device can be easily stored or removed at times when the machine tool is to be operated manually or by the operating personnel without the need for significant quantities of storage space or storage area, even if several corresponding devices must be stored or provided.

Particularly preferably, the housing can have a height between 1.8 m and 2.2 m, preferably between 1.9 m and 2.1 m. Advantageously, this provides enough space or volume to dispose a relatively large workpiece storage in the housing in addition to the positioning device, the workpiece handling unit, the coupling unit and the corresponding operating and control components, if applicable; at the same time, said height allows the transfer of the positioning unit from an extended state into a retracted state when the device is not used or operated; in the retracted state, all components of the device are disposed inside the housing and the device therefore requires or consumes little space or volume.

Another particularly advantageous embodiment of the device can provide that a workpiece detection system is realized, in particular inside the housing, which can directly or indirectly determine at least the dimensions of a workpiece and/or the material of a workpiece which is preferably located in a workpiece holder of the workpiece handling unit. Advantageously, the workpiece detection system can be linked or can establish a data connection to the control system of the device in such a manner that information on a detected, identified or determined workpiece is transmitted or transferred to the control system.

In the case of a direct detection or identification of the workpiece dimensions and/or of the workpiece material, optical systems, such as 3D laser systems, can be used, for example. Said optical systems can directly determine or measure the dimensions of a workpiece in a reliable and precise manner. With respect to the identification of the material, optical direct measurement methods can be used, if applicable. However, other physical properties of the respective materials can also be used to detect said materials in a known manner.

Alternatively, an indirect detection can take place. This means that an identification means is assigned to the workpiece and preferably mounted on the workpiece which has the respective dimensions and is made of the corresponding material; the identification means is then read or recognized by the workpiece detection system and an indirect conclusion on the respective workpiece is thus drawn. Here too, optical detection systems based, for example, on laser engraving, barcode stickers, QR code stickers or the like can be used. Moreover, other identification means, such as RFID tags, NFC tags or other electronically readable identification means having corresponding detection systems can be used.

The object mentioned above is also attained by a system comprising a device according to any one of the embodiments described above and by a machine tool having a processing tool, in particular a milling tool and/or lathe, and a machine vise.

In particular in a coupled state between the device and the machine tool, in particular the machine vise of the machine tool, the system is able to perform not only the actual processing of the workpiece in the machine tool but also the supply of workpieces and the removal of workpieces, including the securing or clamping of workpieces in the machine vise, in an automatic or automated manner. However, since the system allows or enables a reversible coupling of the device, in particular of the coupling unit, to the machine tool, which is substantially effected or caused by the displacement or movement of the positioning device, the system is particularly suitable for a temporarily manual operation, loading, unloading and tensioning of the machine vise, depending on the coupling state of the device. Consequently, the system is advantageously set up in a flexible manner to allow the automatic as well as the manual operation of the machine vise and the loading and unloading of the machine vise.

Advantageously, the system further comprises a workpiece storage which can preferably be disposed or mounted on the device, in particular on a housing of the device. In an advantageous embodiment, the system can alternatively comprise a workpiece supply device in the form of a conveyor belt or the like, for example, in particular in order to enable a long-term automatic operation, loading and unloading of the machine vise, independent of the size or the volume of an integrated or external workpiece storage.

Another advantageous embodiment of the system can provide that the machine tool is provided with an access opening which can be closed in the vertical direction and which is dimensioned in such a manner that the workpiece handling unit can at least partially protrude into the machine tool in the open state. On the one hand, this allows the safe operation of the machine tool. On the other hand, this ensures sufficient access to the machine tool, in particular when the coupling unit is coupled.

A method according to the invention is described below; this method is independently claimable and relates to the operation of a device as described above or to a system as described above.

The arrangement or displacement of the device into an area, preferably in front of, a machine tool and the fixation and the alignment of the device in relation to the machine tool can be carried out in method steps which can optionally precede the method. In said method steps, a roller system of the housing and a zero fixation system can be used. In subsequent optional method steps, the positioning device can then be displaced or moved, preferably out of the housing. Advantageously, this displacement or movement can continue until a coupling has been achieved between a coupling piece of the coupling unit and a drive spindle or a drive journal of the machine vise, preferably while moving or deflecting a spring-loaded balancing system of the coupling unit.

If or as soon as the coupling between the coupling unit and the machine vise has been established, the automatic loading, unloading and operation of the machine vise according to the invention can be performed by the device. As described above, the workpiece handling unit and the positioning device have particularly advantageously already been moved together with the coupling unit towards the machine tool and the machine vise in the course of the coupling method or the coupling process; if applicable, the workpiece handling unit has been partially or completely moved out of the housing in the process. In a method step according to the invention, a workpiece can be selected first, for example via a position in an internal or external workpiece storage.

In a subsequent step or in parallel or, if applicable, in a preceding step, the device can also receive information on the workpiece and possibly on the coupled machine tool.

In another method step according to the invention, the coupling unit can already open, pre-position and/or drive the machine vise to a reference point via the coupling piece.

In a method step according to the invention, the workpiece can be gripped or received by a workpiece holder of the workpiece handling unit and can be moved towards the machine vise by means of corresponding control signals and can be disposed in a pre-position above the machine vise or between the clamping jaws of a machine vise when the machine vise is already opened accordingly.

In another optional method step, the workpiece can then be pre-tensioned inside the machine vise, for which end the coupling piece performs a required opening and/or closing of the machine vise.

In another method step according to the invention, the workpiece can then be clamped in the machine vise. Advantageously, the tensioning or clamping torque is directly or indirectly monitored in the process. For example, a conclusion on the clamping effect of the machine vise on the workpiece can be drawn via the current consumption and/or voltage consumption of the motor or drive motor for driving the coupling piece. Other means for monitoring or detecting a clamping or tensioning state are also available. When the workpiece is clamped, an advantageous method step can provide that the workpiece handling unit applies a force to the workpiece, said force being directed vertically downwards and ensuring that the workpiece is in plane or level contact with the machine vise and that the workpiece is clamped in a correspondingly intended state of the alignment.

In a subsequent method step according to the invention, the clamped workpiece is separated or detached from the workpiece holder of the workpiece handling unit and the workpiece handling unit moves back into an intermediate position; alternatively, the workpiece handling unit already prepares the reception of the following workpiece by approaching another workpiece, for example in a workpiece storage, via the workpiece holder.

After an automated operation of the machine tool, other optional method steps may provide that the coupling unit is detached and removed from the machine tool again via a displacement of the positioning device together with the workpiece handling unit. Preferably, this is done until the positioning device, the coupling unit and the workpiece handling unit are completely or at least partially disposed in a housing of the device. In this state of the device, manual control and manual operation of the machine tool is possible either after the device has been removed or, alternatively, even if the position of the device is unchanged, if applicable, by manually loading and unloading the machine vise and clamping of the workpiece by the operating personnel.

BRIEF DESCRIPTION OF THE DRAWINGS

The device according to the invention, the system according to the invention and the method according to the invention are described below on the basis of merely schematic and exemplary drawings. In the drawings.

DETAILED DESCRIPTION

Figure 1A:
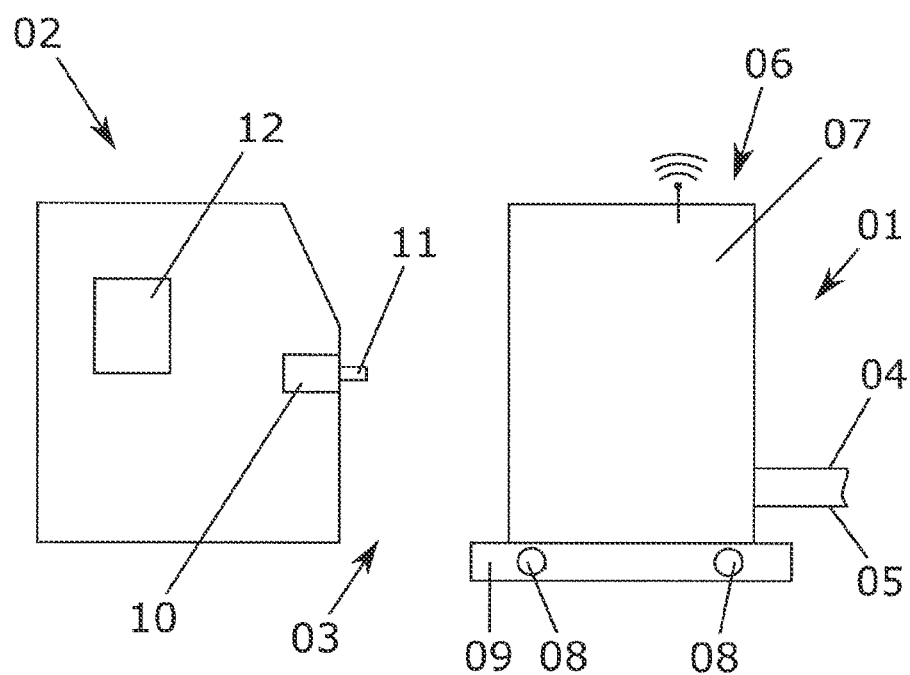
FIG. 1a shows a device according to the invention and a system according to the invention in a first, uncoupled state.

FIG. 1a shows a device 01 which together with a machine tool 02 forms a system 03. In the state of FIG. 1a, device 01 is not coupled to machine tool 02. Instead, device 01 is shown in a retracted state in which, with the exception of an electric supply line 04 and a compressed air supply line 05, all components of the device, including communication interface 06 (shown as an example), are disposed inside the device or inside housing 07 of device 01. Additionally, housing 07 is provided with a roller system 08 which interacts with a zero fixation system 09.

Machine tool 02 comprises a machine vise 10 which has a drive journal or an end of a drive spindle 11 which can be used or operated in order to open, close, clamp and/or release machine vise 10.

Furthermore, machine tool 02 can comprise a processing tool 12, for example a milling tool and/or lathe, machine vise 10 being used to mount and to fix workpieces in such a manner that processing tool 12 can process said workpieces.

Figure 1B:
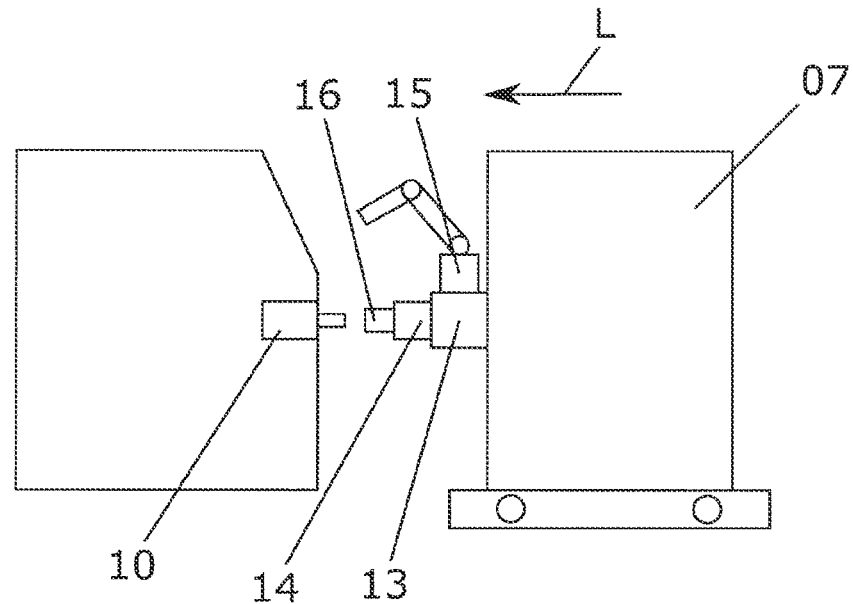
FIG. 1b shows a device according to the invention and a system according to the invention in a second, uncoupled state.

In the state of device 01 and system 03 according to FIG. 1b, a positioning device 13 which is movable in a longitudinal direction L and which is mounted so as to be movable in device 01, in particular in housing 07, has been partially moved out of housing 07. A coupling unit 14 and a workpiece handling unit 15 are connected to positioning device 13 or supported by positioning device 13. For example, workpiece handling unit 15 can be designed as a multiaxial robot unit, preferably as a six-axis robot. As shown and described in more detail with respect to FIG. 2, coupling unit 14 can have a spring-loaded balancing system and a coupling piece 16, the latter being driven in a rotatory manner by a drive motor.

Figure 1C:
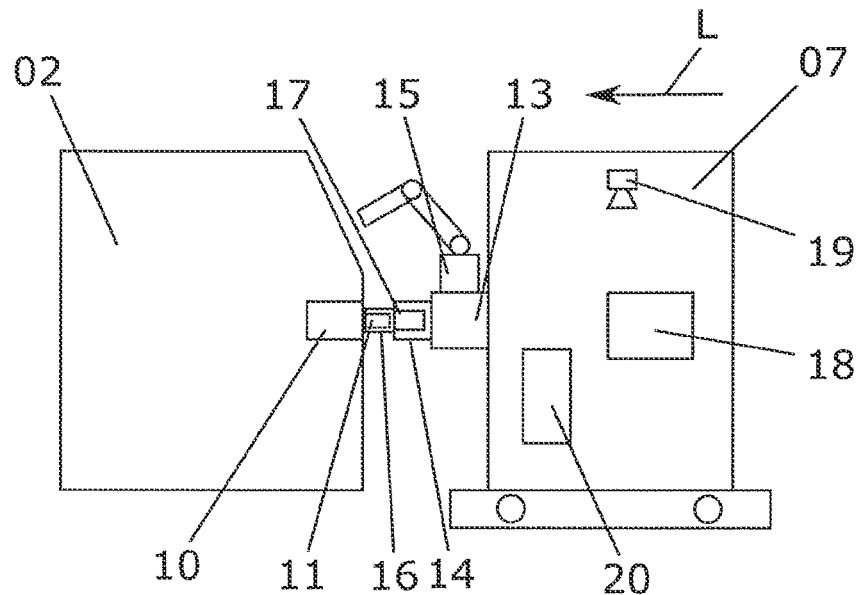
FIG. 1c shows a device according to the invention and a system according to the invention in a third, coupled state.

In the illustration of FIG. 1c, positioning device 13, driven by a hydraulic or pneumatic cylinder (not shown), for example, has been moved out of housing 07 in longitudinal direction L to such an extent that coupling unit 14 contacts machine vise 10 and that a coupling piece 16 of coupling unit 14 engages around drive spindle 11, thus coupling drive spindle 11 to coupling piece 16. Coupling piece 16 can in turn be driven by a preferably electric drive motor 17. As shown in FIG. 1c, moving positioning device 13 farther out of device 01 or out of housing 07 of device 01 has caused workpiece handling unit 15 together with positioning device 13 to move closer towards machine tool 02 and machine vise 10. In the coupling state of system 03 or of device 01 to machine tool 02 shown in FIG. 1, drive spindle 11 of machine vise 10 can be driven by coupling piece 16, which is driven in a rotatory manner, and machine vise 10 can thus be opened, closed and/or pre-tensioned and/or clamped. Additionally, a workpiece can be removed from a workpiece storage 18, which can also be disposed inside housing 07, and supplied to machine vise 10 by means of workpiece handling unit 15. Once the workpiece reaches machine vise 10, said machine vise 10 can be operated, i.e., closed, for example, via coupling unit 14, in particular via coupling piece 16, in order to achieve a clamping and a preceding pre-tensioning, if applicable. Advantageously, the workpiece can be pressed vertically downwards into machine vise 10 or a force can be applied to the workpiece during the creation of the tension or during the clamping and the corresponding drive of coupling piece 16 and the drive of the machine vise spindle caused thereby; this is done to ensure flush placement or contact of the workpiece on and in machine vise 10. Device 01 can further comprise a workpiece detection system 19 which allows a, for example, optical, direct or indirect detection of a workpiece. Furthermore, workpiece handling unit 15 and coupling unit 16 and positioning device 13, if applicable, can be controlled by a shared control system 20 which is preferably also disposed in device 01, in particular in housing 07.

Figure 2:
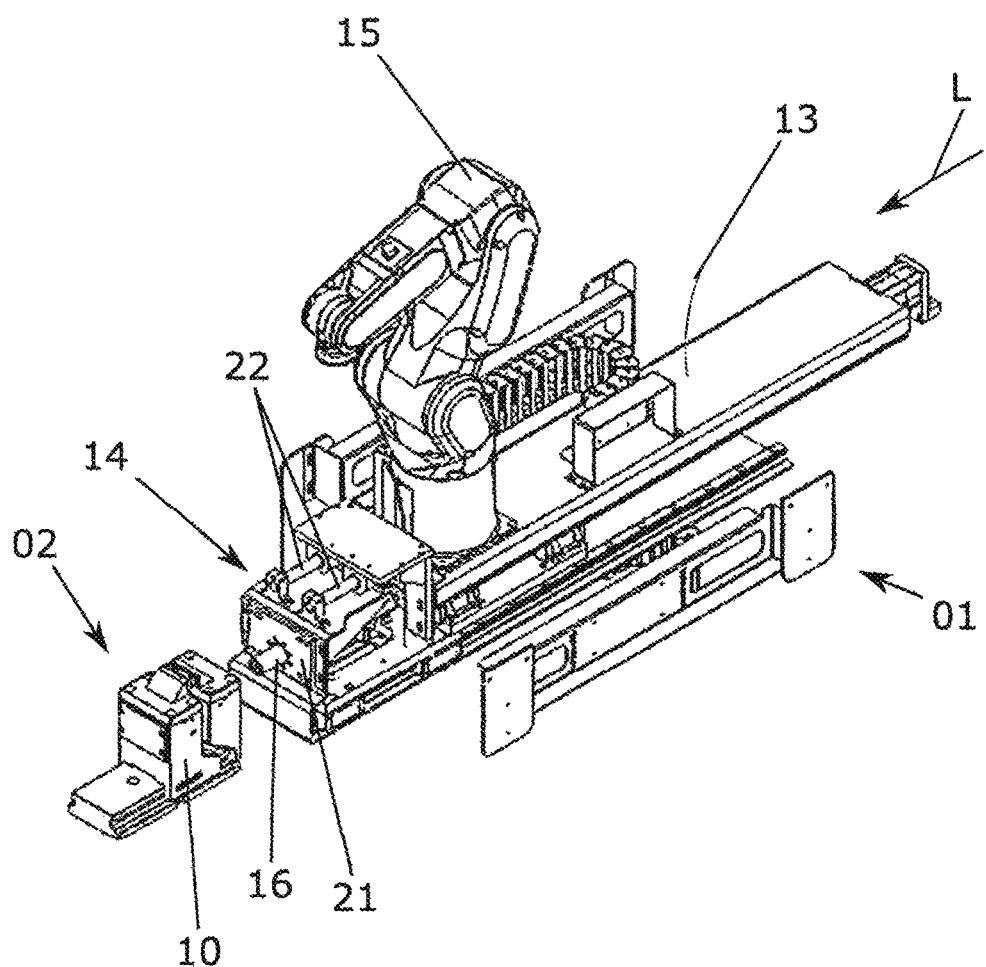
FIG. 2 shows a perspective illustration of a part of the device according to the invention and a part of the system according to the invention in an uncoupled state.

FIG. 2 shows a perspective illustration of a part of the system according to the invention comprising a machine tool 02 and a device 01 according to the invention. For reasons of clarity, parts and components of machine tool 02 and of device 01 are not shown in the view of FIG. 2. For example, machine vise 10 is shown essentially for machine tool 02. However, the end of drive spindle 11 is not shown in the perspective illustration of FIG. 2.

For example, housing 07 is hidden on the side of device 01. The illustration of FIG. 2 mainly focuses on positioning device 13, coupling unit 14, workpiece handling unit 15 and on the details of coupling unit 14. As clearly shown in FIG. 2, both coupling unit 14 and workpiece handling unit 15 can be moved together with positioning device 13 in longitudinal direction L in order to be able to achieve or cause an approximation or distancing to or from machine tool 02 or machine vise 10. If coupling unit 14 reaches a sufficient approximation to machine vise 10, a balancing system 21, which is spring-loaded via spring devices 22, can also be displaced in relation to positioning device 13 in longitudinal direction L or against longitudinal direction L. Depending on the state of balancing system 21, coupling piece 16 of coupling unit 14 can be coupled to drive spindle 11 of machine vise 10, a rotation caused by a drive motor (not shown in detail in FIG. 2) of coupling piece 16 thus being transferable to the drive shaft of machine vise 10. Depending on the direction of rotation of coupling piece 16 or of drive motor 17 of coupling piece 16, machine vise 10 can thus be opened or closed. Furthermore, machine vise 10 can be pre-tensioned or tensioned in a coupled state according to FIG. 1c, the tensioning state or clamping state being detectable via at least one sensor device or one sensor. For example, the current consumption and/or the voltage consumption of drive motor 17 of coupling piece 16 can be used to assess or to measure the clamping state or tensioning state of the clamping jaws of machine vise 10.

FIG. 2 also shows that workpiece handling unit 15 is moved together with positioning device 13 towards machine tool 02 or machine vise 10 in the course of the coupling process and moved away accordingly in the course of the decoupling. This has the advantage that workpiece handling unit 15 is disposed relatively close to machine vise 10 in the coupled state. This in turn has the effect that workpiece handling unit 15 only has to bridge or overcome relatively small distances to load and unload machine vise 10, an overall small and compact workpiece handling unit 15 thus being usable.

FIG. 2, in particular in conjunction with the illustration of FIG. 1c, also shows that an automatic or automated equipping of machine tool 02 can take place in the coupled state; in this automatic or automated equipping, a workpiece is removed from a workpiece storage 18, for example, and is supplied to machine vise 10 by means of workpiece handling unit 15; at the same time or in a subsequent step, machine vise 10 is operated via coupling unit 14, in particular coupling piece 16, this operation allowing the reception of the workpiece and the tensioning of the workpiece, if necessary while performing a pre-tensioning step. Workpiece handling unit 15 also allows a pressing of the workpiece into machine vise 10 or a force application to the workpiece during the tensioning process in such a manner that a flush or plane contact of the workpiece with the surfaces of machine vise 10 is ensured. After the detachment of the workpiece from a workpiece holder of workpiece handling unit 15 and a corresponding removal of workpiece handling unit 15 from machine tool 02, an automatic processing of the workpiece can be performed, for example after closing an opening of machine tool 02; following the processing, workpiece handling unit 15 can be used again to automatically perform the removal of the processed workpiece in interaction with coupling unit 14, in particular with coupling piece 16, by analogy with the loading process of machine vise 10.

Particularly advantageously, a system 03 according to the invention can thus be realized for a plurality of existing and standardized machine tools by adding device 01 according to the invention to machine tools 02, system 03 allowing a temporarily automatic feeding or equipping of machine tools 02, including an automatic clamping of the workpieces. The particular advantage is that a manual operation or a manual feeding or equipping of machine tool 02 can be performed without modification of machine tool 02 via a new decoupling of device 01 from machine tool 03, essentially by a new displacement or movement of positioning device 13 in longitudinal direction L or against longitudinal direction L. An extremely flexible system is thus provided.

REFERENCE SIGNS 01 device
02 machine tool
03 system
04 supply line
05 compressed air supply line
06 communication interface
07 housing
08 roller system
09 zero fixation system
10 machine vise
11 drive spindle
12 processing tool
13 positioning device
14 coupling unit
15 workpiece handling unit
16 coupling piece
17 drive motor
18 workpiece storage
19 workpiece detection system
20 control system
21 balancing system
22 spring devices
L longitudinal direction

The invention claimed is:

1. A device for loading and unloading and for operating a machine vise (10) of a machine tool (02), the device comprising:
a positioning device (13) mounted and configured to be displaced along a longitudinal direction (L),
a coupling unit (14) movable together with the positioning device (13) and disposed at one end of the positioning device (13) in the longitudinal direction (L), and
the machine vise (10) of the machine tool (02), wherein the positioning device (13) is displaceable along the longitudinal direction (L) toward and away from the machine vise (10), and wherein the coupling unit, when moved toward the machine tool (02) with the positioning device (13), couples with the machine vise (10) and, in a coupled position, operates the machine vise (10), and
a workpiece handling unit (15) disposed on the positioning device (13) behind the coupling unit (14) in the longitudinal direction so as to be (L), wherein the workpiece handling unit (15) is configured to be moved together with the positioning device (13).

2. The device according to claim 1, wherein the workpiece handling unit (15) is a multiaxial robot unit.

3. The device according to claim 1, wherein the coupling unit (14) has a spring-loaded balancing system (21) which is movable in relation to the positioning device (13) in the longitudinal direction (L) and a coupling piece (16) which is driven in a rotatory manner by means of a drive motor (17) and which is movable together with the positioning device (13) and which serves for the coupling to a drive journal or a drive spindle (11) of the machine vise (10).

4. The device according to claim 1, wherein the workpiece handling unit (15) is disposed in such a manner that a workpiece holder of the workpiece handling unit (15) is configured to reach the machine vise (10) when the coupling of the coupling unit (14) to the machine vise (10) has taken place.

5. The device according to claim 1, further comprising a shared housing (07) which encloses the positioning device (13) together with the coupling unit (14) and the workpiece handling unit (15) in a retracted state.

6. The device according to claim 5, wherein the housing (07) comprises a workpiece storage (18) or a coupling device for a workpiece storage (18) or a workpiece supply device.

7. The device according to claim 5, wherein the housing (07) has a roller system (08) comprising a zero fixation system (09) at the bottom.

8. The device according to claim 5, wherein the housing (07) accommodates all operating and control devices, whereby only an energy supply and a communication interface (06), having to be provided in order to operate the device (01).

9. The device according to claim 5, wherein the housing (07) has a base area between 0.8 m$^2$ and 1.5 m$^2$.

10. The device according to claim 9, wherein the base area is between 1.0 m$^2$ and 1.2 m$^2$.

11. The device according to claim 1, further comprising a workpiece detection system (19) which is configured to directly or indirectly determine at least the dimensions of a workpiece which is located in a workpiece holder of the workpiece handling unit (15).

12. A system (03) comprising a device (01) according to claim 1 having a processing tool (12).

13. The system according to claim 12, wherein the processing tool is a milling tool and/or a lathe.

14. The system according to claim 12, wherein the machine tool (02) is provided with an access opening which is configured to be closed in the vertical direction and which is dimensioned in such a manner that the workpiece handling unit (15) is configured to at least partially protrude into the machine tool (02) in the open state.

* * * * *